Patented Apr. 30, 1929.

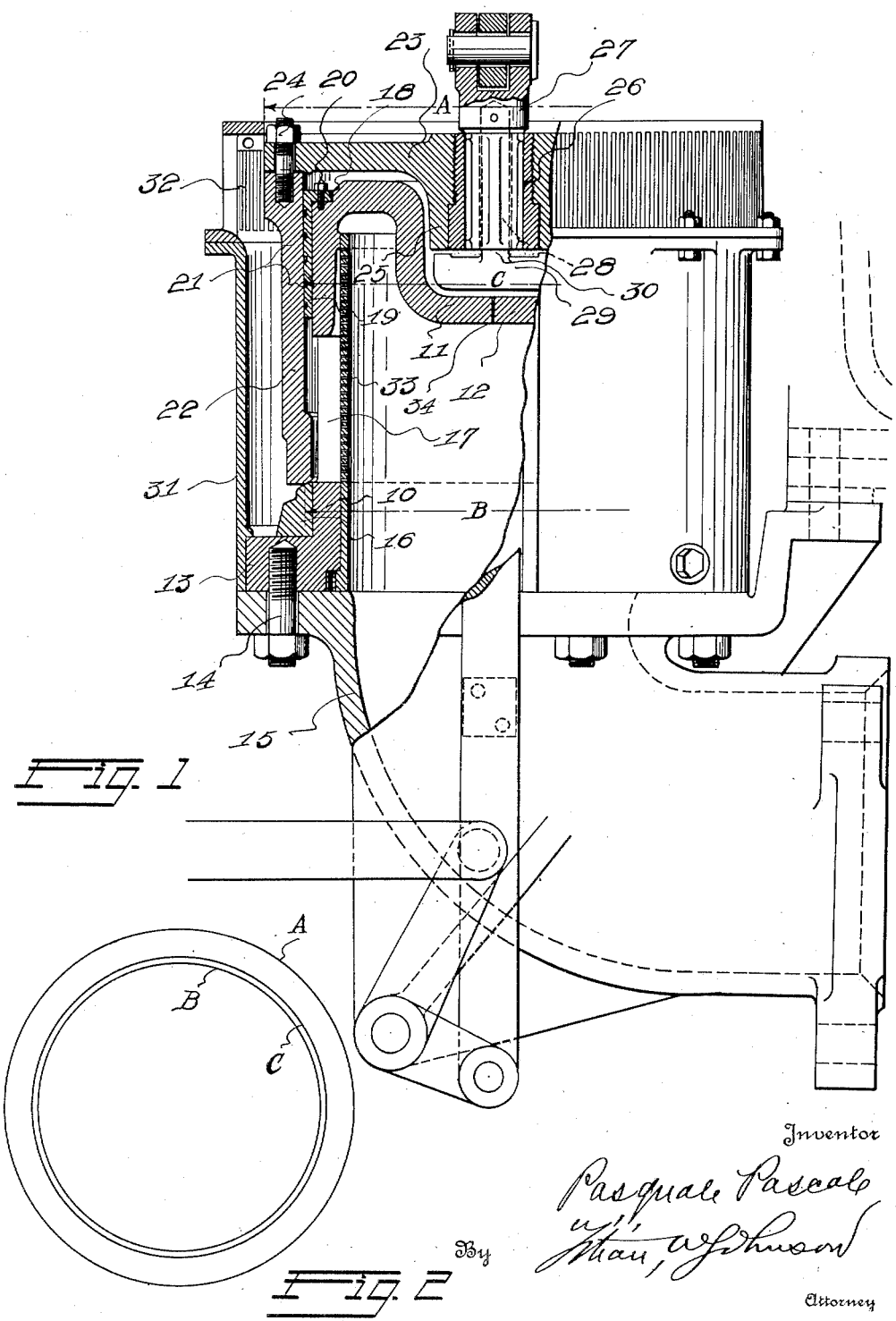

1,710,946

UNITED STATES PATENT OFFICE.

PASQUALE PASCALE, OF NEW YORK, N. Y., ASSIGNOR TO DRI-STEAM VALVE CORPORATION, A CORPORATION OF DELAWARE.

STEAM VALVE.

Application filed August 28, 1926. Serial No. 132,282.

This invention relates to valves and has special reference to a throttle valve of the type used in locomotive boilers and other boilers wherein the steam flow from the boiler passes through a dry pipe located within the boiler and having a valve at its inlet end.

More particularly the invention relates to locomotive throttle valves.

In valves for this purpose it is quite common to have the moving member of the valve in the form of a cylinder and the fixed member of the valve in the form of a piston fitting within the cylinder, a seat being formed on the piston member against which the open end of the cylinder fits. With such construction the pressure on the head of the cylinder exerted by the steam within the boiler is so great that, unless relieved, it is practically impossible to unseat the valve. To relieve this pressure it is common to provide a port in the head of the cylinder and a relief valve to control this port, the relief valve being arranged to be opened by the throttle lever connections in advance of the lifting of the main valve from its seat. By this means steam under pressure is admitted within the cylinder and tends to lift this cylinder against the external pressure thereon. However, as at present constructed the total pressure within the cylinder can never equal that holding the cylinder on its seat so that there remains a very substantial unbalanced seating pressure which, coupled with the frictional resistance of the valve operating mechanism, renders the throttle valve very hard to open, pulls of one hundred and fifty pounds on the throttle being frequently necessary to unseat the valve even with the operating mechanism arranged to give compound leverage.

The present invention contemplates the constructing of throttle valves in such manner that the pressure on the valve tending to seat the cylinder will be fully balanced or may even be overbalanced so as to remove the gravitational resistance effects due to the weight of the valve and associated movable parts.

The principal object of the present invention is to provide a valve of this character wherein the pressure area of the piston will be at least equal to the difference between the maximum outside diameter of the cylinder and the maximum or outer diameter of the valve seat so that the internal pressure will at least balance the external pressure.

With the above and other objects in view as will be hereinafter apparent, the invention consists in general of certain novel details of construction and combinations of parts hereinafter fully described, illustrated in the acompanying drawings and specifically claimed.

In the accompanying drawings like characters of reference indicate like parts in the several views, and:

Figure 1 is a vertical section taken diametrically through a valve constructed in accordance with this invention.

Figure 2 is a diagram showing the effective internal and external pressure areas of such a valve.

In the present drawings there is shown a valve having a stationary body portion 10 of hollow cylindrical form and provided at its upper end with a head 11 having an inverted dome shaped central portion 12 to receive the head of the pilot or relief valve to be presently described. The lower open end of this body is provided with an external flange 13 so that it may be secured by bolts 14 to the end of the dry pipe 15. This flange also forms a seat for the valve seat ring 16 and immediately above this ring 16 the side wall of the body is provided with ports 17. The top of the ring 16 is beveled to form the valve seat but it is to be noted that only the upper part of this bevel is used for the valve seat so that in referring to such valve seat only that part actually engaged by the valve is intended to be understood.

Around the periphery of the head 11 at its upper edge is formed a rabbet wherein rests the internal flange 18 of a sleeve 19 which fits the upper end of the body and is secured thereto by bolts 20 passing through the flange 18 into the body. This sleeve is provided with spaced peripheral grooves holding packing rings 21. Thus the top end of the body 10 is arranged to form a piston.

The movable member of the valve or main valve proper consists of a cylinder having a head at one end and open at the other. This cylinder is formed by a sleeve 22, the lower end of which is substantially of equal internal diameter to the external diameter of the body, the upper end being preferably a sliding fit on said body. The inner edge of this lower end is beveled to seat on the before mentioned valve seat and the outer diameter of the beveled portion (which equals the outer diameter of the true valve seat) is no greater than the outer diameter of the piston, or in other words, of the sleeve 19. The upper part of this sleeve 22 fits the sleeve 19 slidably and carries a head 23 removably secured to the sleeve by bolts 24. This head has a depending central boss 25 wherein is screwed a valve cage 26 having a valve seat at its upper end on which is normally seated the head 27 of the pilot or relief valve. The grooved stem 28 of this valve passes through the valve cage and terminates at its lower end in a head 29 provided with lugs 30 arranged to prevent closing of the lower end of the cage 26. The head 27 is also provided with a yoke for the attachment of the valve actuating mechanism which may be of any preferred arrangement and one form of which is shown in my copending application for patent or steam valves, filed November 12, 1925, Serial Number 68,718. As also shown in the above copending application a steam drying device may be employed in connection with this valve as is indicated by the outer casing 31 supporting the slotted ring 32 and the inner perforated sleeve 33. A bleeder 34 is provided to permit closing of the main valve.

The relative pressure areas of these parts are diagrammatically shown in Figure 2 wherein the circle A indicates the downward pressure area of the valve proper at its maximum diameter and the circle B indicates the effective pressure area of the piston and also the area of the valve seat at its maximum diameter. Then the annulus between the circumferences of A and B indicates the upward pressure area on the sleeve so that it is seen that the effective downward pressure area on the sleeve equals the effective pressure area within the cylinder tending to move the sleeve upward. It will also be noticed that the piston circumference on the diameter C is represented in Figure 2 by the circle C. The total upward pressure therefore is the area within the circle C plus the area of the annulus between the circles A and B. The total downward pressure, however, is represented by the area within the circle A. As here shown the circle C is of slightly greater diameter than the circle B so that there is a small amount of upward over-balance in the diagram in Figure 2, such upward over-balance being for the purpose of balancing the weight of the valve itself. Thus it is seen that it is important that the diameter of the piston be at least as large as the diameter B in Figure 1. Thereby the resistance due to steam pressure against unseating the main valve will be quickly balanced upon opening the pilot valve so that the only resistance to be overcome will be that due to friction and the weights of the parts. Obviously the outer diameter of the piston sleeve can be increased so as to overbalance the effective downward pressure to such degree as may be desired as, for instance, sufficient to overcome the gravitational effect due to the weight of the cylinder and other moving parts. Under this arrangement the only force requisite to be exerted in opening the throttle is that necessary to overcome the friction of the parts.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

While it has been stated above that the proportions of the piston sleeve and co-acting parts may be so proportioned as to overbalance the effective downward pressure sufficiently to overcome the gravitational effect due to the weight of the cylinder and other moving parts, it is to be understood that from a practical standpoint especially in locomotive valves, it is not desirable to overbalance the pressure entirely, or may be not to overcome the resistance of the friction of the parts, because the engineer or operator would rather feel some quite appreciable resistance to his manual manipulations in opening the throttle so that he will always be conscious of having done the thing necessary or desirable to be done.

Having thus described the invention, what is claimed as new, is:

1. In a valve of the class described, a hollow cylindrical body closed at one end and having a valve seat extending peripherally around the body adjacent the other end, said body having ports in its side wall adjacent the valve seat, a sleeve fitted on the closed end of said body, said closed end and sleeve being arranged to constitute a piston having a diameter at least as great as the maximum diameter of the valve seat, a cylinder valve slidably mounted on the piston and having one end arranged to fit the valve seat and the other end being provided with a head, and pilot valve means for admitting pressure between the piston and cylinder head, said pilot valve being arranged for opening and closing in advance of like movements of the cylinder valve.

2. In a valve of the class described, a hollow cylindrical body closed at one end and having a valve seat extending peripherally around the body adjacent the other end, said body having ports in its side wall adjacent the valve seat, a sleeve fitted on the closed end of said body, said closed end and sleeve being arranged to constitute a piston having a diameter at least as great as the maximum diameter of the valve seat, a cylinder valve slidably mounted on the piston and having one end arranged to fit the valve seat and the other end being provided with a head, a pilot valve carried centrally of the head to admit pressure beneath the head and seating on the head upon downward movement, a stem on said valve extending through said head and provided with an enlarged lower end beneath the head to limit upward movement of the valve, and means carried by the pilot valve adapted for connection of valve operating mechanism.

In testimony whereof he affixes his signature.

PASQUALE PASCALE.